Dec. 23, 1947.   D. B. BAKER ET AL   2,433,083
SPINDLE MOISTENING APPARATUS
Filed Feb. 22, 1943    2 Sheets-Sheet 1
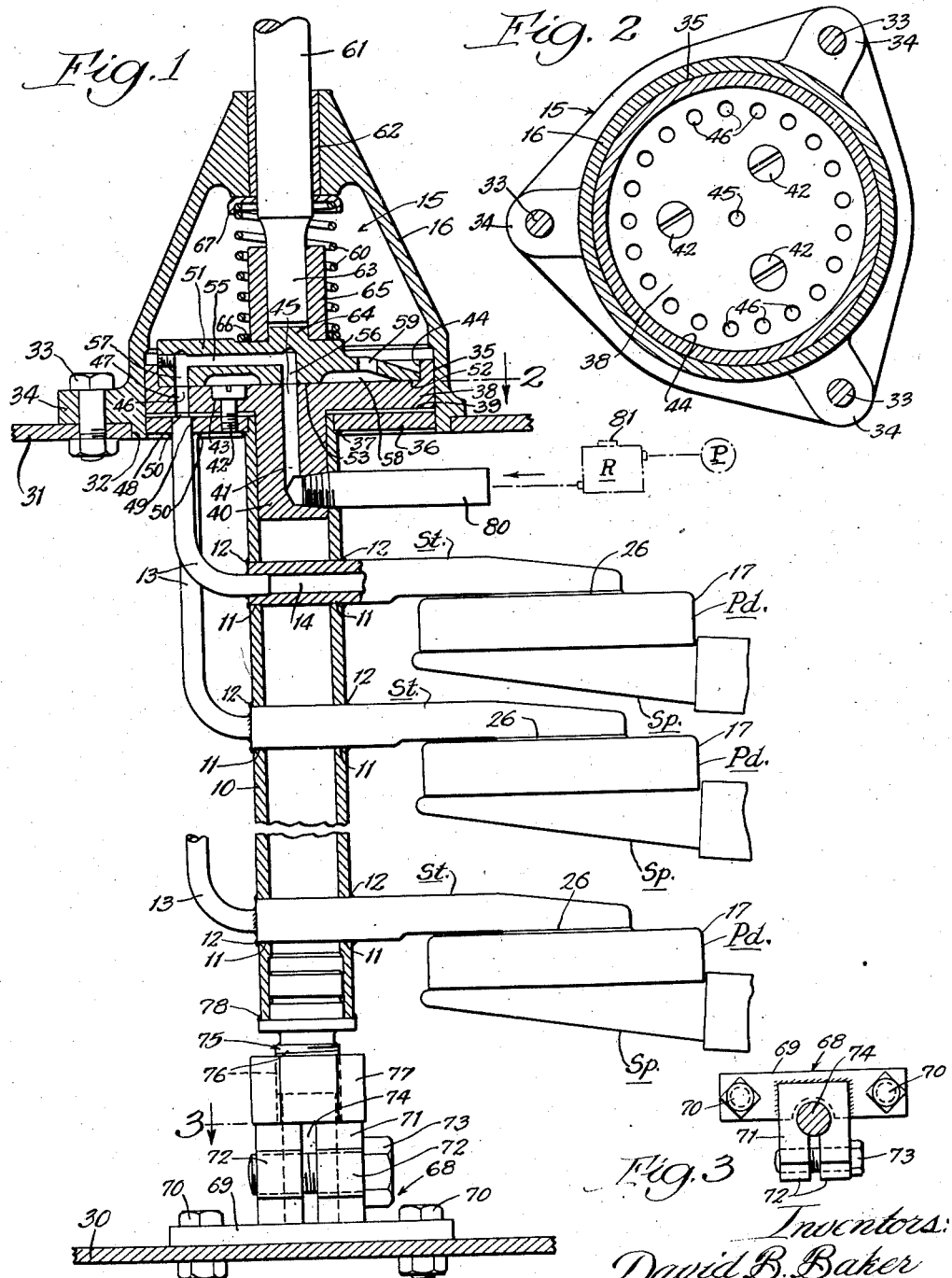

Dec. 23, 1947.       D. B. BAKER ET AL       2,433,083
SPINDLE MOISTENING APPARATUS
Filed Feb. 22, 1943       2 Sheets-Sheet 2
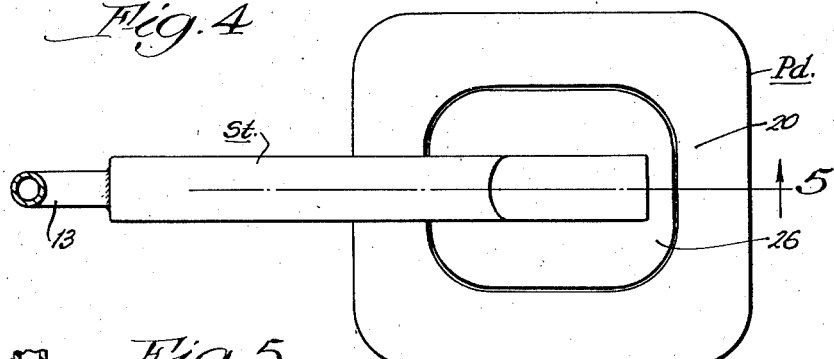
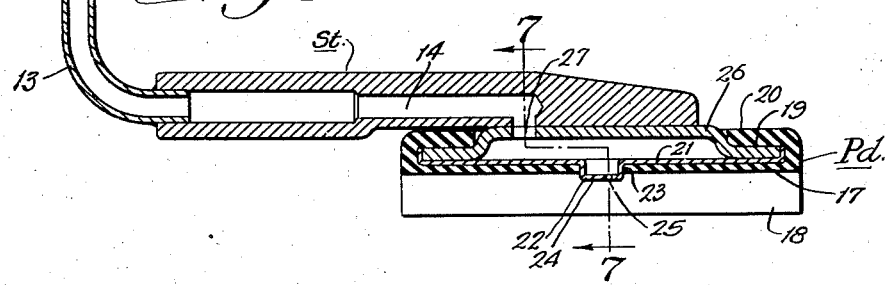
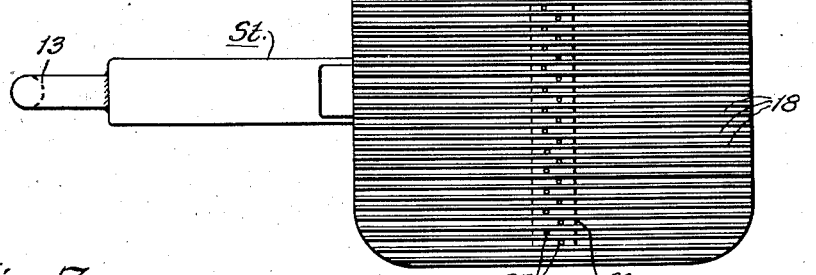
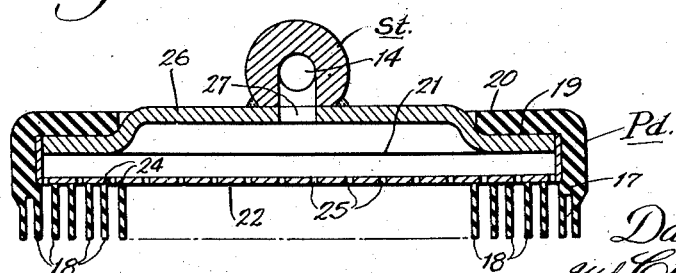
Inventors:
David B. Baker
and Clarence R. Hagen,
By Paul O. Pippel
Attorney.

Patented Dec. 23, 1947

2,433,083

UNITED STATES PATENT OFFICE 2,433,083

SPINDLE MOISTENING APPARATUS

David B. Baker, Riverside, and Clarence R. Hagen, Chicago, Ill., assignors to International Harvester Company, a corporation of New Jersey Application February 22, 1943, Serial No. 476,705

2 Claims. (Cl. 56—41)

1

This invention relates to moistening apparatus for picker spindles and that is particularly suited for moistening the picker spindles of cotton-picking machines.

The picker spindles of cotton-picking machines can be made to have an affinity for the crop fibers by moistening, as with water, the surface of those parts onto which the seed cotton is to be wrapped for extraction from the boll. Another function of the liquid deposited on the spindles is to cleanse them of plant juice which is sticky and if allowed to remain on the spindles would cause the adherence of dirt particles and the consequent building up of a hard, rough coating that would diminish picking efficiency. Since the essential amount of liquid thus used is substantial, it is desirable that this amount shall not be exceeded by the delivery of more water to some spindles than necessary. Otherwise the liquid reservoir becomes disproportionate in size.

An important object of this invention is the provision of a novel spindle moistener apparatus which functions to periodically feed predetermined quantities of liquid to the spindles.

Another object is the provision of an apparatus of the present type that delivers liquid by separate conduits to spindle moistener pads and in a manner that the relative elevation of the pads is no factor in determining the delivery rate.

Another object is the provision of an improved spindle moistener apparatus which periodically injects measured quantities of liquid into lines individually communicating with spindle moistener pads so as to forcibly clear these lines and their pinhole discharge openings, should any tendency to clog arise.

A further object is the provision of a unique combination in the support of the spindle moistener pads upon a standard common to a liquid distributor which is slidably guided in its casing to permit axial adjustment of the standard for placing the pads in the proper position with respect to their associated spindles. This position changes as the pads are eroded by the spindles while the machine is in service.

These and other desirable objects inherent in and encompassed by the invention will be more apparent from the ensuing description together with the annexed two sheets of drawings, wherein:

Fig. 1 is a vertical fragmentary sectional view illustrating a preferred form of the liquid-distributing apparatus in association with cotton-picking spindles to be moistened thereby;

2

Fig. 2 is a transverse sectional view taken on the line 2 of Fig. 1;

Fig. 3 is a horizontal sectional view taken on the line 3 of Fig. 1;

Fig. 4 is a plan view of a moistener pad and a supporting stem therefor;

Fig. 5 is a vertical sectional view taken through the pad and stem of Fig. 4, as indicated by the line 5;

Fig. 6 is a bottom view of the pad and stem shown in Fig. 4; and

Fig. 7 is a transverse sectional view taken on the line 7—7 of Fig. 5.

Referring now to Fig. 1 of the drawings, the moistening apparatus can there be seen in association with a portion of a vertical row of cotton-picking spindles Sp illustrated by dotted lines. A typical cotton-picking spindle carrier is illustrated in United States Patent No. 2,259,894 to E. A. Johnston. However, for the purpose of this disclosure it will suffice to say that the spindles Sp are arranged in vertical rows upon a spindle drum or carrier apparatus, and that while only three spindles are shown in Fig. 1, there are, in fact, a considerably greater number of spindles in each vertical row. For example, in one installation there are fourteen cotton-picking spindles in each vertical row of spindles, and this number may be varied in accordance with the height of the cotton plant for which the machine is designed. The present apparatus as will appear later is designed for use upon a machine having twenty-one spindles per row. During operation of the cotton-picking machine, these vertical rows of spindles Sp are rotated about their individual axes $a$—$a$ while they are also swept laterally beneath and in wiping relation with respectively associated moistening pads Pd of the present apparatus. After being moistened at the station where the pads Pd are located, the picker spindles Sp are swept laterally from the station and projected into the cotton plant where their rotation about their individual axes $a$—$a$ facilitates their wrapping of the fibrous crop there onto and extracting the same from the bolls. In a later cycle, the crop bearing spindles are withdrawn from the plant and carried into doffing relation with a doffer brush (not shown) which removes the cotton from the spindles, and following this the spindles will be again presented to the moistening pad station for remoistening preparatory to continuation of the operating cycle.

The moistening pads Pd are supported upon hollow stems St, which in turn are supported from a vertical standard 10 which is hollow and has pairs of diametrically opposed openings 11 in which the shanks of said stems are anchored and welded, as indicated at 12. A moistening fluid, such as water, is delivered to the pads through individual conduits 13 and channels 14 in the stems St, and the quantity of liquid thus delivered is determined by a liquid-feeding apparatus or distributing unit 15 contained within a casing 16 in the upper part of Fig. 1. This apparatus 15 will be described in detail hereinafter.

While any suitable type of pad may be employed in connection with the apparatus, the illustrated pad comprises a substantially rectangular rubber portion 17 from which there depends a series of thin, flexible, fin-like ribs 18, which are clearly shown in Figs. 6 and 7. The base portion 17 of the pad has a pocket 19 formed on its back side by an inwardly directed parametric flange 20, which is in spaced relation with the lower side of the base member 17 from which the ribs 18 depend. Within this pocket 19 there is placed a generally rectangular plate 21 having an intermediate channel portion 22, which projects downwardly through an opening 23 which extends entirely across the pad base 17. Portions of the ribs 18 are also cut away at 24 to accommodate the channel-shaped portion 22. Small pinhole openings 25 are distributed lengthwise of the channel 22 in staggered relation, as clearly shown in Fig. 6, and the spacing of these openings lengthwise of the channel is such as to cause them to register with the spaces between the pad ribs 18. The plate 21 is preferably sealed to the pad Pd at all points of contact therewith to prevent the leakage of liquid from the pocket 19. Such sealing is obtainable by vulcanizing the rubber to the plate 21.

The parametric flange 20 of the pads Pd, since it is stretchable, is adapted to be distorted incident to the insertion of pad-holding plates 26 into the pocket 19. These plates 26 are also rectangular and fit snugly into their pockets 19. The plates 26 also are gripped with sufficient firmness by the pad flanges 20 to establish a sufficient seal therebetween for preventing the escape of liquid from the pocket 19. Communication with the pockets 19 of the pads Pd with the channels 14 in the stems St is had through openings 27 in the pad-holding plates 26. The moistener pad structure illustrated in Figs. 4 to 7 is disclosed and claimed in copending application Serial No. 477,438, of David B. Baker et al., for Spindle moistener pad, now Patent Number 2,368,708.

The moistener pad supporting standard 10 together with said pads are enclosed within a housing of which only a bottom plate 30 and a top plate 31 are shown. An opening 32 in the housing top plate 31 receives the lower open end of the casing 16, and this said casing is secured in this assembly with the top plate 31 by three bolts 33, which pass through apertured ears 34 and suitable openings in the upper housing wall. A cylindrical guide bearing 35 is formed coaxially with the casing 16 within and adjacently to its lower end. This guide bearing slidably receives the liquid-feeder apparatus 15 so that such apparatus together with the standard 10 and the pads Pd may be vertically adjusted in a manner presently described.

A disk 36 is secured onto and about the upper end of the standard 10 as by welding at 37. This disk 36 comprises a part of a header structure which also includes a header plate 38 which is separated from the disk or plate 36 by a gasket member 39. The parts 36, 37, and 39 all bear slidingly upon the cylindrical guide bearing surface 35. A boss 40 coaxial with the header plate 38 and also integral therewith projects downwardly snugly into the upper end of the standard 10. This boss 40 thus lends rigidity to the structure, in addition to the providing of a liquid-receiving channel 41 through which moistening liquid for the pads Pd is introduced into the feeder apparatus. The parts 36, 38, and 39 are held axially together by three machine screws 42 of which the heads are disposed in countersinks 43 within the bottom of a cylindrical recess 44 in the upper base of the header plate 38. The bottom of the cylindrical recess 44 has a central port 45 through which the vertical channel 41 opens into said recess and also has a plurality, 21, of circumferentially spaced ports 46 through which vertical channels in the header structure communicate with said recess 44. These header channels have portions 47, 48, and 49, respectively, in the header plate 38, the gasket member 39, and the header disk 36, which are axially alined as illustrated in the left-hand part of Fig. 1. The upper ends of the conduits 13 are disposed within the channel portions 49 where they are welded in place, as indicated at 50.

The liquid feeder apparatus 15 also includes a feeder member 51 in the form of a plate which is disposed within the recess 44 of the header structure for rotation coaxially of said recess. An annular bearing and sealing surface 52 is formed upon the under side of the feeder member 51 adjacently to its edge. This annular surface 52 slides flatly upon that portion of the bottom of the recess 44 with which it is in contact. Near the center of the lower face of the feeder member 51 there is a circular bearing and sealing surface 53, which slides in sealing relation upon and about that portion of the bottom of the recess 44 immediately about the ported upper end of the liquid-receiving channel 41. Thus liquid introduced into the channel 41 under pressure is directed upwardly into a channel 55 within said feeder member, this channel 55 having an inlet port 56 in registry with the channel 41 and an outlet port 57, which is adapted to successively register with the ports 46 of the circumferentially spaced header structure channels. An annular space 58 in the under side of the feeder member 51 receives any liquid which may escape radially along the area of contact between the bearing surfaces 52 and 53 and the bottom of the recess 44, and any liquid collecting in the space 58 may escape upwardly through an opening 59 in said member 51 so there will be equalization of fluid pressure above and below said member 51, wherefore the force of an expansion spring 60 tending at all times to force the feeder member 51 downwardly upon the bottom of said recess will not be contravened.

Driving force for rotating the feeder member 51 is received through a drive shaft 61, which is journaled in a bearing 62 in the upper end of the casing 16. The lower end of the drive shaft 61 has a squared section 63 corresponding in transverse dimensions to a squared boss 64 upon the upper face of the feeder member 51. A telescopic coupling member 65, having a square bore corresponding in cross-sectional dimensions to the parts 63 and 64, is slid over the parts 63 and 64 and welded as at 66 to the upper face of the member 51. An axial sliding fit exists between the squared portion 63 of the drive shaft 61 and the coupling member 65 so that the liquid-feeder apparatus 15 may be adjusted vertically without disturbing the effectiveness of the driving connection between the drive shaft and the feeder member 51. The spring 60, which bears within a spring cut 67 at its upper end, is operable to maintain sufficient pressure between the sealing surfaces 52 and 53 and the portions of the recess bottom against which they bear irrespective of the vertical position of the liquid-feeder apparatus 15.

An adjustable support for the pad-supporting standard 10 is indicated generally at 68 in Figs. 1 and 3. This support comprises a plate 69 secured by bolts 70 to the housing bottom member 30. A split collar 71 is secured to the plate 69 as by welding and has at opposite sides of the split therein a pair of apertured ears 72, of which the aperture of one is threaded to receive the threaded portion of a shank upon a locking screw 73. A smooth cylindrical lower end portion 74 of a base member 75 is disposed within the collar 71. A short section 76 of the member 75 is threaded and meshed with the threads in a nut 77 which rests upon the collar 71. The base member 75 is secured as by welding at 78 to the lower end of the standard 10. Adjustment in the height of the standard 10 and hence of the pads Pd is possible when the locking bolt 73 is loosened to permit expansion of the split collar 71. Under these conditions, the nut 77 is rotatable to allow the threaded base member 75 to lower or cause said base member 75 to be projected upwardly from the nut, depending upon the direction the latter is rotated. After the desired adjustment has been accomplished, the locking bolt 73 will be rotated for tightening the split collar 71 upon the shank 74 of the member 75 to prevent axial movement of the latter. An adjustment in the height of the standard 10 will be necessary periodically to compensate for erosion of the pad fins 18 by the spindles Sp.

In the operation of the apparatus, a supply of liquid is provided in a reservoir R, which is connected through a conduit 80 with the liquid-receiving channel 41 of the header plate 38. The liquid within the reservoir is maintained under a pressure of say 15 pounds per square inch, and this may be done, as in the present instance, by an air pump P, which may be driven intermittently for restoring the pressure in the reservoir to the desired maximum after slight depletions, or said pump may be continuously driven and the excess of air pumped thereby toward the reservoir R by-passed through a suitable valve of conventional construction. Replenishment of liquid in the reservoir is possible through an opening covered by a closure cap 81.

The drive shaft 61 is rotated in timed relation with the operation of the picker spindles Sp so that while the cotton-picking machine is operating, said shaft 61 and the feeder member 51 will be rotated. While the outlet port 57 of the liquid delivery channel 55 in said feeder member 51 is between adjacent of the ports 46 in the header plate 38, said port 57 will be sealed closed by the coaction of the annular bearing surface 52 on the lower face of said feeder member 51 and that portion of the bottom of the recess 44 upon which said sealing surface bears. However, each time the port 57 registers with one of the ports 46, the pressure maintained upon the liquid in the reservoir R will cause a quantity of liquid to be injected through said port 46 into the associated conduit 13 to determine the amount available for discharge through openings 25 in the associated pad Pd. While these openings 25 are small and, therefore, referred to as pinhole openings, they may be of any desired diameter or shape, or may be replaced by a narrow slit-like opening extending across the plate 21. The amount of liquid injected through the ports 46 each time the discharge port 57 of the feeder member 51 is in registry with a port 46 is determined by the amount of pressure maintained in the reservoir and by the speed at which the feeder member 51 is rotated. The latter factor, however, may be disregarded inasmuch as the operating speed of the machine will be substantially constant. Normally the liquid will drain from the conduits outwardly through the pads sufficiently fast that no back pressure is incurred in the tubes 13 in opposition to the injections through the header plate. After the discharge port 57 of the feeder member passes from registry with one of the ports 46, the part of the sealing surface 52 trailing adjacently to said port 57 will seal the port 46, and thus prevent back surging of fluid from any of the conduits 13, should there be an obstruction therein or in an associated pad, or, if the pressure in the reservoir should be increased to a point that the injection delivery into the conduits exceeded the gravitational feed through the pads. Any necessity for sealing a port 46 through which fluid has been injected will be but for an instant, since the liquid is non-compressible at the pressures involved and since the openings 25 in the pads Pd preclude the maintenance of any back pressure within the conduits 13.

Since the amount of liquid introduced into the conduit 13 for ultimate delivery to the pads Pd and transfer on the spindles Sp is in periodic measured quantities of equal value, each of the pads Pd receives the same amount of liquid. The fact that part of the pads are at different elevation from others will be of no significance with respect to the amount of liquid received as has been the case in certain of the prior art moistening devices. There is the further advantage in this apparatus that a force feed is employed, and that the liquid is delivered in impulses which are very effective for dislodging particles which might otherwise tend to obstruct or clog the pinhole openings 25 or the fluid delivery channels leading thereto.

While we have herein shown and described a preferred form of apparatus, it should be understood that the invention encompasses other forms, constructions, and details falling within the spirit thereof and not sacrificing all of its advantages.

What is claimed is:

1. In a picker spindle moistener apparatus; a moistener pad supporting standard; moistener pads on said standard; a casing having a drive shaft bearing and a distributor unit guide bearing; a liquid distributor unit mounted on said standard and disposed in said guide bearing to facilitate adjustment thereof within said casing axially of and with said standard, said distributor unit including a header having a plurality of channels, and a rotatable feeder member having a liquid delivery channel sequentially placed in communication with the header channels during rotation of said member; a drive shaft journaled in said drive shaft bearing; a driving connection between said drive shaft and said rotatable feeder member; said driving connection being telescopic so it can remain mobilized while facilitating said adjustment of the distributor unit in said guide bearing; conduits communicating between the header channels and said pads; and means for retaining said standard and the parts thereon in selected positions of axial adjustment wherefore the pads are adjustable with respect to spindles to be moistened thereby.

2. In a moistener apparatus, a tubular moistener pad support standard having a plurality of axially spaced transversely directed bores therethrough having openings in generally opposite side wall portions of said standard, pad supporting stems having shank end portions inserted into and through the standard bores for anchorage upon said standard, moistener pads upon said stems at portions adjacent to their opposite ends, each of said stems being channeled to provide communication between the pad thereon and the stem shank portion, a liquid distributor unit at an end of said standard, and fluid delivery conduits leading from said distributor unit axially of the standard respectively into communication with the channels in said stems at the shank portions thereof.

DAVID B. BAKER.
CLARENCE R. HAGEN.

REFERENCES CITED

The following references are of record in the file of this patent:

UNITED STATES PATENTS

| Number | Name | Date |
|---|---|---|
| Re. 19,411 | Rust | Jan. 1, 1935 |
| 1,747,566 | Berry | Feb. 18, 1930 |
| 1,968,390 | Hamilton | July 31, 1934 |
| 2,024,690 | Harris | Dec. 17, 1935 |
| 2,287,945 | Purat | June 30, 1942 |